(12) United States Patent
Charrette et al.

(10) Patent No.: US 7,059,638 B2
(45) Date of Patent: Jun. 13, 2006

(54) SELF-FASTENING SEWER TAP

(75) Inventors: Joseph Paul Charrette, Chambly (CA); Jean Claude Goyette, St-Jean-sur-Richelieu (CA); Germain Veronneau, St-Paul D'Abbotsford (CA)

(73) Assignee: Plastiques GyF Ltee, Quebec (CA)

( * ) Notice: Subject to any disclaimer, the term of this patent is extended or adjusted under 35 U.S.C. 154(b) by 83 days.

(21) Appl. No.: 10/768,851

(22) Filed: Jan. 30, 2004

(65) Prior Publication Data

US 2004/0245769 A1 Dec. 9, 2004

Related U.S. Application Data

(60) Provisional application No. 60/475,482, filed on Jun. 4, 2003.

(51) Int. Cl.
*F16L 41/00* (2006.01)

(52) U.S. Cl. ..................... 285/205; 285/189

(58) Field of Classification Search .............. 285/197, 285/189, 205, 208, 213, 214, 136.1
See application file for complete search history.

(56) References Cited

U.S. PATENT DOCUMENTS

| | | | | |
|---|---|---|---|---|
| 3,981,061 | A | * | 9/1976 | Jackson et al. ............. 285/209 |
| 4,365,829 | A | * | 12/1982 | Fowler .................... 285/140.1 |
| 4,735,443 | A | * | 4/1988 | Rush et al. .............. 285/139.1 |
| 5,145,216 | A | * | 9/1992 | Valls, Jr. .................. 285/140.1 |
| 5,551,590 | A | * | 9/1996 | Mazur et al. ............. 220/23.83 |
| 5,971,441 | A | * | 10/1999 | Ishikawa et al. ............ 285/197 |
| 6,089,615 | A | * | 7/2000 | Jappinen .................... 285/208 |
| 6,508,490 | B1 | * | 1/2003 | Hoffman ..................... 285/197 |

* cited by examiner

*Primary Examiner*—David Bochna
(74) *Attorney, Agent, or Firm*—Darby & Darby

(57) ABSTRACT

A self-fastening tap for connecting a branch pipe to an aperture of a given diameter provided in a main pipe. The tap comprises a hollow cylindrical body having a first open end of a given diameter and a second open end opposed to the first open end. The cylindrical body is sized to fit and seal the aperture provided in the main pipe. The first open end has an outer side provided with a flexible lip and an inner side provided with abutment means for abutting the branch pipe. The flexible lip has an outer diameter larger than the diameter of the first open end of the cylindrical body. The second open end has an outer side provided with an outer rim. The tap comprises removable at least one spacing ring slideably mounted around the cylindrical body, between the flexible lip and the outer rim.

15 Claims, 4 Drawing Sheets

SELF-FASTENING SEWER TAP

FIELD OF THE INVENTION

The present invention relates to taps, and more particularly to an easy to install self-fastening tap that can be adjusted with multiple sizes of main pipes for connecting a branch pipe.

BACKGROUND

Connecting and joining a branch pipe to a main pipe is generally done by pouring concrete on the joint between the branch pipe and the main pipe. Since the connection between the branch and the main pipes is often underground, it is subjected to breakage due to the weight of the soil above and around the connection, which results in an undesired filtration. Although alternative methods and various mechanical apparatus, such as saddles, are available, they are very costly to implement and must be specially adapted for each situation. For example, a saddle designed to fit around a main pipe can hold the branch pipe and provide a sealed connection between the main and branch pipes. However, using saddles for complex constructions are not usually suitable for connecting the branch pipe to the main pipe because of the difficulties of building a really accurate connection underground (e.g. an excavation after uncovering an existing main pipe). Moreover, rigid support usually provided by saddle connection may also result in possible breakage and undesired filtration.

SUMMARY OF THE INVENTION

A first object of the present invention is to provide a self-fastening tap capable of overcoming the above mentioned drawbacks.

Another object of the present invention is to provide a tap which is cheap to mass produce.

A further object of the present invention is to provide a tap which prevents the filtration encountered with poured concrete seals.

Still another object of the present invention is to provide a tap which is flexible in order to prevent the same from cracking due to the weight of the ground below the pipes.

Another object of the present invention is to provide a tap which conveniently locks the branch pipe within the main pipe.

Another object of the present invention is to provide a tap which does not require the use of any exterior clamps or locking devices.

According to the present invention, the above objects are achieved with a self-fastening tap for connecting a branch pipe to an aperture of a given diameter provided in a main pipe. The tap comprises a hollow cylindrical body having a first open end of a given diameter and a second open end opposed to the first open end. The cylindrical body is sized to fit and seal the aperture provided in the main pipe. The first open end has an outer side provided with a flexible lip and an inner side provided with abutment means for abutting the branch pipe. The flexible lip has an outer diameter larger than the diameter of the first open end of the cylindrical body. The second open end has an outer side provided with an outer rim. The tap also comprises at least one removable spacing ring slideably mounted around the cylindrical body, between the flexible lip and the outer rim.

Preferably, the cylindrical body has an inner wall provided with a peripheral recess forming a vacuum chamber around the branch pipe when the branch pipe is inserted in the tap. Such avoids unwanted removal of the branch pipe from the tap by accident or due to water flow.

Preferably, also the flexible lip has a truncated cone shape to help ensure watertightness at a junction of the main pipe with the cylindrical body.

Preferably, the self-fastening tap is fastened to a main sewer pipe.

The objects, advantages and other features of the present invention will become more apparent upon reading of the following non-restrictive description of a preferred embodiment thereof, given with reference to the accompanying drawings.

DETAILED DESCRIPTION OF A PREFERRED EMBODIMENT

Figure 1A:
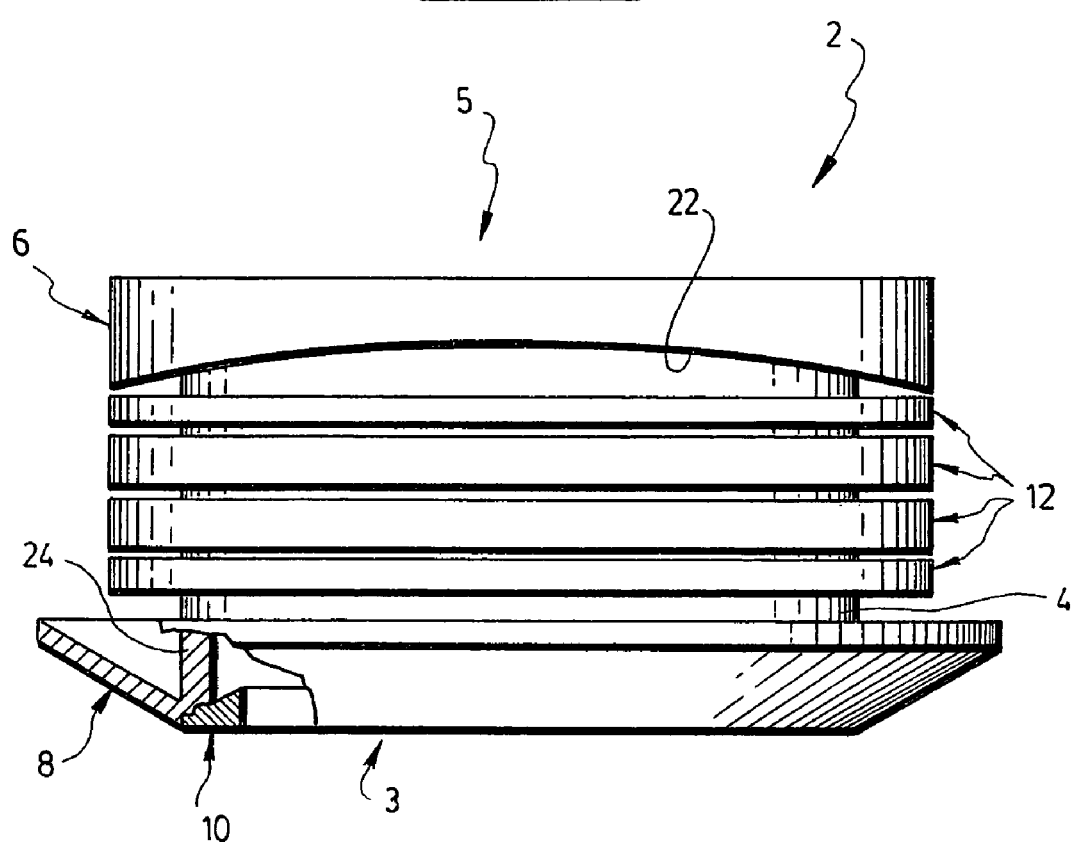
FIGS. 1a and 1b are partial cross section side views of a self-fastening tap according to a preferred embodiment of the present invention.

Referring to FIGS. 1a, 1b, 3 and 4, there is shown a self-fastening tap 2 according to a preferred embodiment of the invention for connecting a branch pipe 20 (shown in FIG. 2e) to an aperture 16 provided in a main pipe 14. Preferably, the main pipe 14 can be a corrugated pipe. The self-fastening tap 2 comprises a hollow cylindrical body 4 having a first open end 3 of a given diameter and a second open end 5 opposed to the first open end 3. The cylindrical body 4 is sized to fit and seal the aperture 16 provided in the main pipe 14. The first open end 3 has an outer side provided with a flexible lip 8 and an inner side provided with an abutment device 10 for abutting the branch pipe 20 so as to prevent the same from being introduced within the cylindrical body 4 beyond the first open end 3. The flexible lip 8 has an outer diameter larger than the diameter of the first open end 3 of the cylindrical body 4. The second open end 5 has an outer side provided with an outer rim 6. The self-fastening tap 2 also comprises at least one removable spacing ring 12 slideably mounted around the cylindrical body 4, between the flexible lip 8 and the outer rim 6. Preferably, the tap 2 has a plurality of spacing rings 12 of different thicknesses. When mounted to the main pipe 14, the tap 2 tightly sandwiches the wall of the main pipe 14 between the flexible lip 8 and the spacing ring 12 facing the same.

Figure 1B:
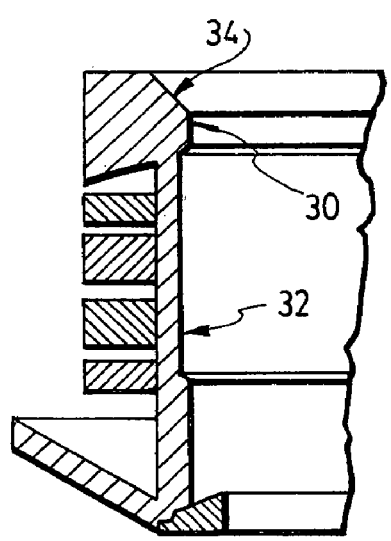

As better shown in FIGS. 1a and 1b, the cylindrical body 4 preferably has an inner wall 30 provided with a peripheral recess 32 forming a vacuum chamber around the branch pipe 20 when the branch pipe 20 is inserted in the tap 2. The suction effect created by the vacuum chamber avoids unwanted removal of the branch pipe 20 from the cylindrical body 4 by accident or due to water flow. The branch pipe 20 tightly fits within the cylindrical body 4.

The flexible lip 8 can have a truncated cone shape to help ensure watertightness at the junction of the main pipe 14 with the cylindrical body 4. The flexible lip 8 is in continuous contact with the inner surface of the main pipe 14 by overlapping the inside edge 26 defining the aperture 16.

To adjust to small variations in the diameter of the main pipes manufactured by different companies, the tap 2 can have a tightening device for tightening the cylindrical body 4 to the main pipe 14. In the illustrated case, the tightening device consists of a curved surface 22 made in the outer rim 6 and facing the flexible lip 8. Once the tap 2 is inserted within the aperture 16, a user only need to rotate the outer rim 6 to tighten or loosen the tap 2 inserted within the main pipe 14.

Preferably, the cylindrical body 4 is made of a one piece elastomeric material. The spacing rings 12 can also be made of the same elastomeric material.

Referring now to FIGS. 2a to 2e, installing the self-fastening tap 2 is easy and does not require any other fixation equipment like a collar, from there the name self-fastening. Different steps for installing the self-fastening tap 2 are provided in FIG. 2 as examples.

Figure 2A:
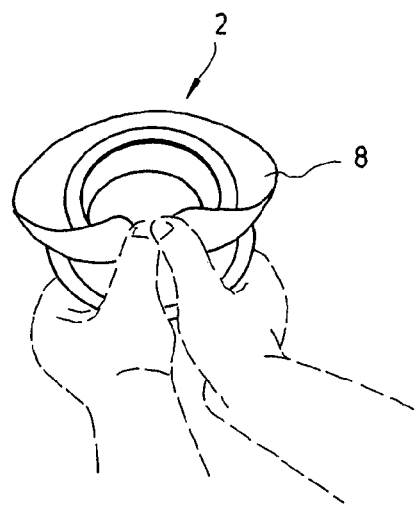
FIGS. 2a, 2b, 2c, 2d and 2e are different schematic views illustrating an installation procedure of the self-fastening tap shown in FIG. 1.
Figure 2B:
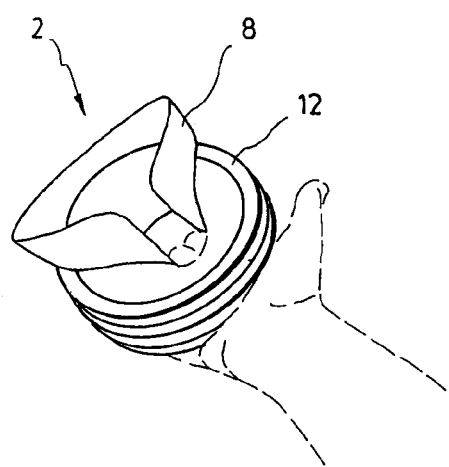

As shown in FIGS. 2a–2b, a portion of the flexible lip 8 along with the cylindrical body 4 are fold inwardly toward the hollow part of the cylindrical body 4 to facilitate insertion of the first open end 3 of the cylindrical body 4 within the aperture 16 of the main pipe 14.

Figure 2C:
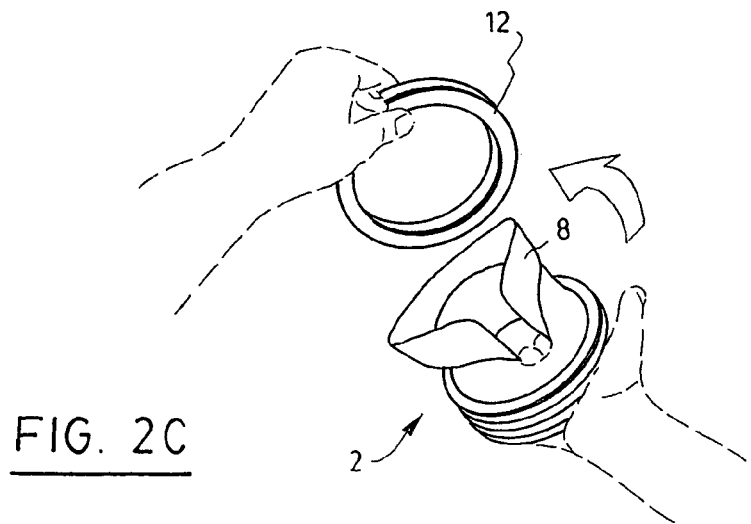

As shown in FIG. 2c, some of the spacing rings 12 can be removed from the cylindrical body 4 or added around it, if required, depending of the thickness of the corrugations 28 of the main pipe 14. The distance between the flexible lip 8 and the spacing ring 12 facing the same corresponds to the thickness of the corrugations 28. If the main pipe 14 has no corrugations 28, the number of spacing rings 12 used is determined by the outer diameter of the main pipe 14.

Figure 2D:
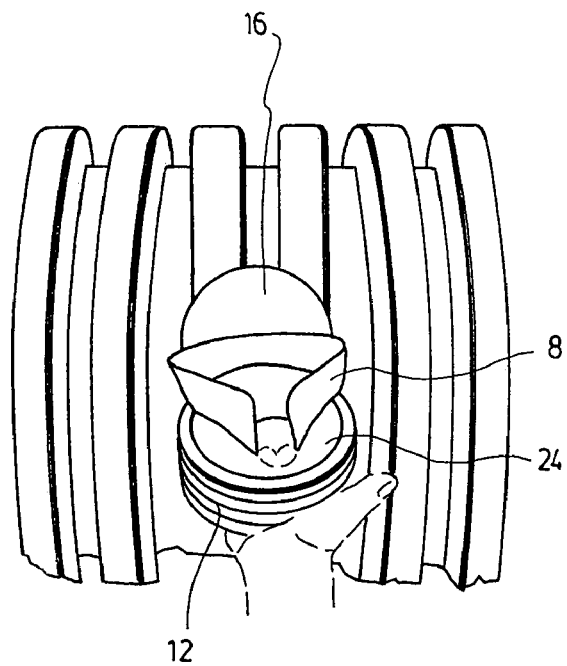

As shown in FIG. 2d, the first open end 3 of the cylindrical body 4 is inserted within the aperture 16 while the flexible lip 8 is still being fold.

Figure 2E:
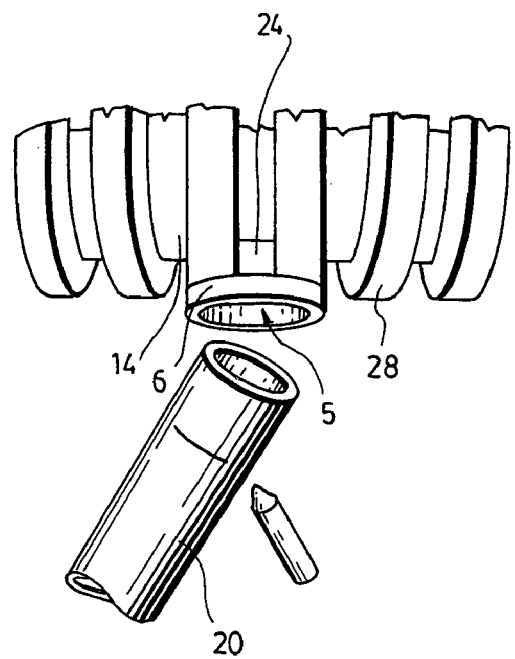
Figure 3:
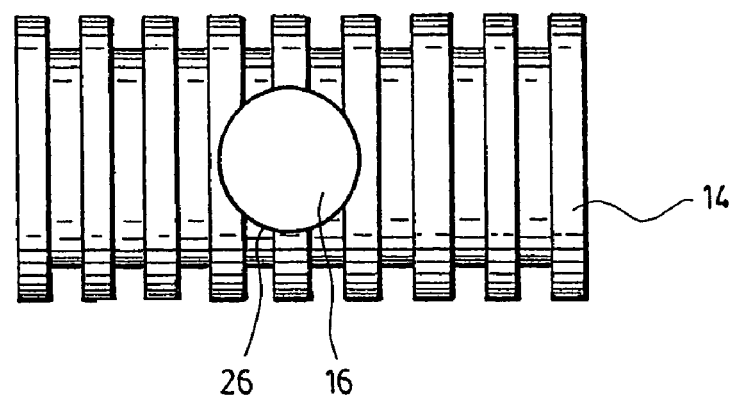
FIG. 3 is a side elevational view of a main pipe section having an aperture for inserting the self-fastening tap shown in FIG. 1.
Figure 4:
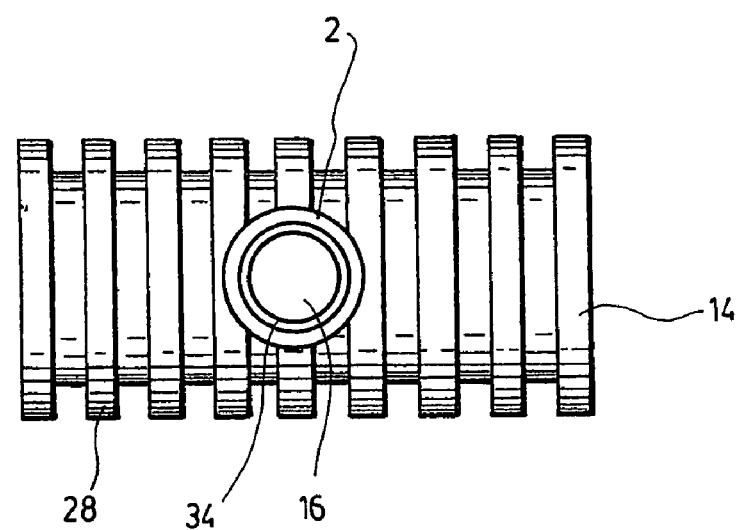
FIG. 4 is a side elevational view of the main pipe section of FIG. 3 with the self-fastening tap inserted within the aperture.

As shown in FIG. 2e, the flexible lip 8 is unfold and ensures watertightness at the junction of the main pipe 14 with the cylindrical body 4. The cylindrical body 4 is extending outwardly away from the aperture 16 of the main pipe 14. When the tap 2 is connected with the main pipe 14, the branch pipe 20 is inserted within the second open end 5 of the cylindrical body 4. The abutment device 10 prevents the branch pipe 20 from being introduced within the cylindrical body 4 beyond the first open end 3. The outer wall 24 of the cylindrical body 4 can be conveniently slightly larger than the diameter of the aperture 16. Consequently, when a part of the branch pipe 20 within the cylindrical body 4 extends into the aperture 16, the outer wall 24 is compressed against the inside edge 26 defining the aperture 16 to seal and lock the self-fastening tap 2 into position with respect to the main pipe 14. Furthermore, the second open end 5 can have an inner bevelled edge 34 (better shown in FIG. 1) to facilitate the insertion of the branch pipe 20 within the cylindrical body 4. If needed, the outer rim 6 having the curved surface 22 can be rotated to tightly fix the tap 2 to the main pipe 14.

The self-fastening tap 2 can be used with a main sewer pipe and a branch sewer pipe. The tap 2 can also be used with other types of pipes.

Although the present invention has been explained hereinabove by way of a preferred embodiment thereof, it should be pointed out that any modifications to this preferred embodiment within the scope of the appended claims is not deemed to alter or change the nature and scope of the present invention.

The invention claimed is:

1. A self-fastening tap for connecting a branch pipe to an aperture of a given diameter provided in a main pipe, said tap comprising:
    a hollow cylindrical body having a first open end of a given diameter and a second open end opposed to the first open end, said cylindrical body being sized to fit and seal the aperture provided in the main pipe, the first open end having an outer side provided with a flexible lip and an inner side provided with abutment means for abutting the branch pipe, the flexible lip having an outer diameter larger than the diameter of the first open end of the cylindrical body, the second open end having an outer side provided with an outer rim, and
    the cylindrical body having an inner wall provided with a peripheral recess forming a vacuum chamber around the branch pipe when said branch pipe is inserted in the tap; and
    at least one removable spacing ring slideably mounted around the cylindrical body between the flexible lip and the outer rim.

2. A self-fastening tap according to claim 1, wherein the flexible lip has a truncated cone shape to help ensure water tightness at a junction of the main pipe with the cylindrical body.

3. A self-fastening tap according to claim 1 wherein said at least one spacing ring comprises a plurality of rings having different thicknesses.

4. A self-fastening tap according to claim 1, wherein the cylindrical body is made of a one piece elastomeric material.

5. A self-fastening tap according to claim 1, wherein the cylindrical body has an outer wall having a diameter slightly smaller than the diameter of the aperture provided in the main pipe.

6. A self-fastening tap according to claim 5, further comprising a curved surface made in he outer rim and facing said flexible lip to tighten said cylindrical body to said main pipe, and wherein the flexible lip has a truncated cone shape to ensure water tightness at a junction of the main pipe with the cylindrical body.

7. A self-fastening tap according to claim 1 wherein the second open end of said cylindrical body has an inner beveled edge to facilitate insertion the branch pipe within said cylindrical body.

8. A self-fastening tap according to claim 7, wherein:
    said cylindrical body has an outer wall having a diameter slightly smaller than the diameter of the aperture provided in the main pipe; and
    the flexible lip has a truncated cone shape to ensure water tightness at a junction of the main pipe with the cylindrical body.

9. A self-fastening tap according to claim 1, further comprising a curved surface made in the outer rim and facing said flexible lip to tighten said cylindrical body to said main pipe.

10. A self-fastening tap according to claim 1, wherein the tap is fastened to a main sewer pipe.

11. A self-fastening tap for connecting a branch pipe to an aperture of a given diameter provided in a main pipe, said tap comprising:
    a hollow cylindrical body having a first open end of a given diameter and a second open end opposed to the first open end, said cylindrical body being sized to fit and seal the aperture provided in the main pipe, the first open end having an outer side provided with a flexible lip and an inner side provided with abutment means for abutting the branch pipe, the flexible lip having an outer diameter larger than the diameter of the first open end of the cylindrical body, the second open end having an outer side provided with an outer rim; and tightening means of a curved surface made in the outer rim and facing the flexible lip for tightening the cylindrical body to the main pipe; and at least one removable spacing ring slideably mounted around the cylindrical body, between the flexible lip and the outer rim.

12. A self-fastening tap according to claim 11, wherein:

the cylindrical body has a inner wall provided with a peripheral recess forming a vacuum chamber around the branch pipe when said branch pipe is inserted in the tap;

said cylindrical body has an outer wall having a diameter slightly smaller than the diameter of the aperture provided in the main pipe; and the second open end of said cylindrical body has an inner beveled edge to facilitate insertion the branch pipe within said cylindrical body.

13. A self-fastening tap according to claim 12, wherein said cylindrical body is made of a one piece elastomeric material.

14. A self-fastening tap according to claim 11, wherein:

the flexible lip has a truncated cone shape to ensure water tightness at a junction of the main pipe with the cylindrical body; and the second open end of said cylindrical body has an inner beveled edge to facilitate insertion the branch pipe within said cylindrical body.

15. A self-fastening tap according to claim 14 wherein said at least one spacing ring comprising a plurality of rings having different thicknesses, and wherein the second open end of said cylindrical body has an inner beveled edge to facilitate insertion the branch pipe within said cylindrical body.

* * * * *